No. 889,776. PATENTED JUNE 2, 1908.
H. G. DYER.
TROLLEY WIRE SPLICER.
APPLICATION FILED SEPT. 12, 1907.
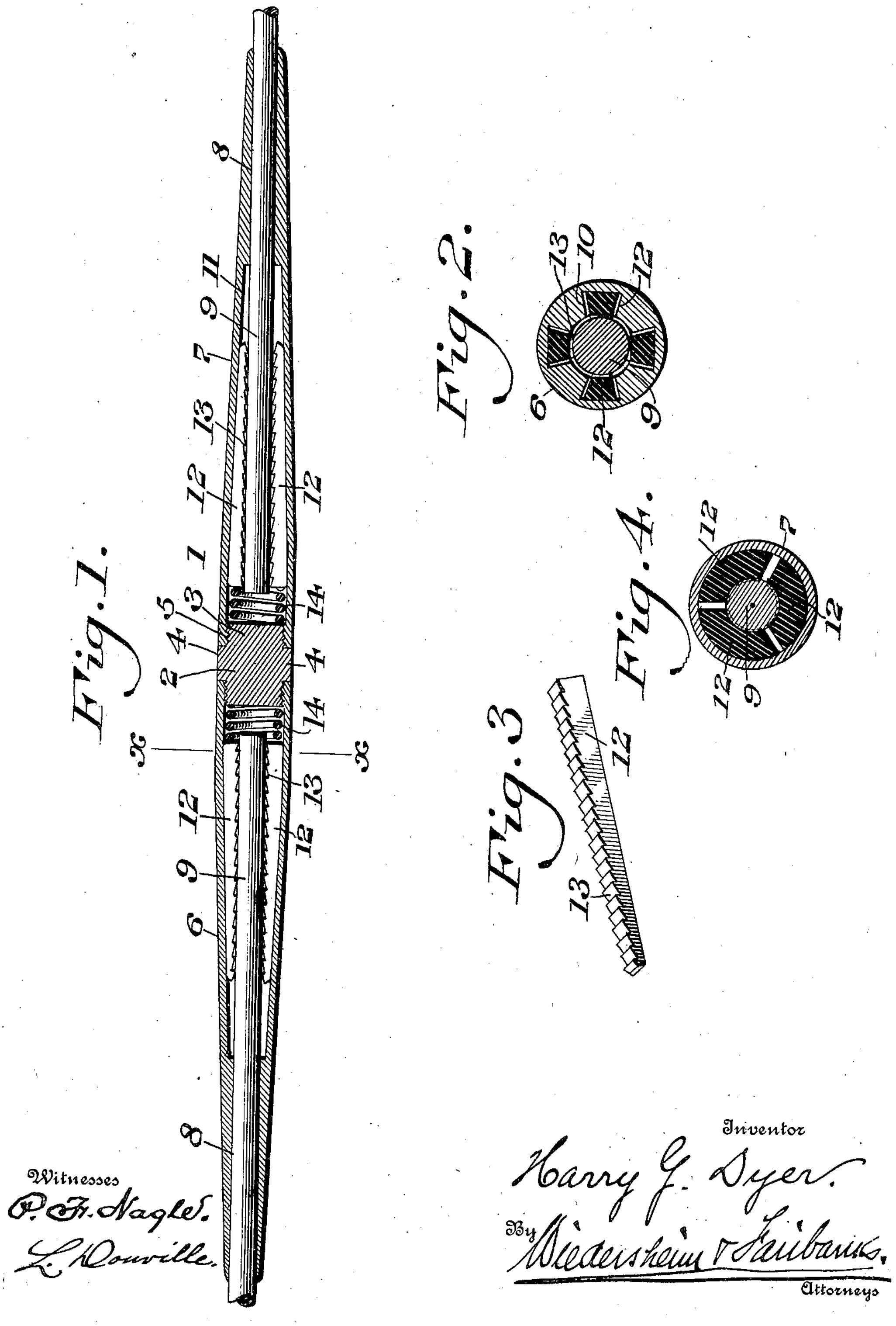
Witnesses
P. F. Nagle.
L. Douville.
Inventor
Harry G. Dyer.
By Wiedersheim & Fairbanks,
Attorneys

UNITED STATES PATENT OFFICE.

HARRY G. DYER, OF GLOUCESTER CITY, NEW JERSEY, ASSIGNOR OF ONE-HALF TO WILLIAM J. VAN METER, OF GLOUCESTER CITY, NEW JERSEY.

TROLLEY-WIRE SPLICER.

No. 889,776. Specification of Letters Patent. Patented June 2, 1908.

Application filed September 12, 1907. Serial No. 392,600.

*To all whom it may concern:*

Be it known that I, Harry G. Dyer, a citizen of the United States, residing in Gloucester City, county of Camden, State of New Jersey, have invented a new and useful Trolley-Wire Splicer, of which the following is a specification.

My invention relates to a new and useful trolley wire splicer and consists in providing means for grasping the wire and which can be caused to engage with and be disengaged from the wire in a quick and expeditious manner.

It further consists of other novel details of construction, all as will be hereinafter fully set forth.

Figure 1 represents a horizontal sectional view of a trolley wire splicer embodying my invention. Fig. 2 represents a sectional view on line *x*—*x*, Fig. 1. Fig. 3 represents a perspective view of one of the toothed jaws employed. Fig. 4 represents a sectional view showing a means of mounting the jaws in the tubes.

Similar numerals of reference indicate corresponding parts in the figures.

Referring to the drawings:—in the trolley wire splicers now used, it is necessary that the wire be bent or looped at its end in order to engage with the splicer and the latter is a large and cumbersome device, and after the wire is connected therewith, it is extremely difficult to release the same. My invention is designed to overcome these defects and while I have shown in the drawings, a construction for carrying out my invention, it will be evident that other instrumentalities may be employed and a different arrangement of the parts may be made without departing from the spirit of my invention and I therefore desire to make such changes as may be necessary.

1 designates a trolley wire splicer consisting of the plug or body portion 2 upon the threaded portions 3, the ends of the tubes 6 and 7 preferably abutting the shoulder 4 in order that they will be properly held in position. The tubes 6 and 7 are of similar construction and are provided with a bore 8 of suitable size to receive the trolley wire and through which bore the end 9 of the trolley wire is passed.

10 designates slots formed in the inner wall of each of the tubes 6 and 7, the outer walls 11 of which are inclined towards the outer ends, as will be best understood from Fig. 1. Seated in said slots are the wedge shaped jaws 12, preferably provided with teeth 13, the edge of said jaws upon which the teeth are situated being inclined as best understood from Fig. 3, said jaws being adapted to be situated in said slots 10 and with the flat or plane face of the jaws contacting with the inclined walls 11 of the slots.

14 designates springs situated between the plug 2 and the ends of the jaws 12, said spring tending to hold said jaws in proper position.

The operation of the parts just described will be readily apparent:—An end 9 of a trolley wire is passed through the bore 8 of one of the tubes and passes between the jaws 12, which will be forced inwardly towards the body 2 as the wire is inserted. As soon as the same is released and any pull is exerted upon the wire away from the body 2, the teeth will be caused to grip the wire, since the tendency of the movement of the jaws 12 will be towards the outer ends of the tubes, thus causing the inclined face of the walls 11 to form a wedging action with the inclined face or wedge shape of the jaws 12, so that the teeth will engage more tightly with the wire, preventing withdrawal of the end of the wire therefrom. In order to release the wire should it become necessary, it will be apparent that by unscrewing the tube from the body 2, the jaws can be released from engagement with the wire which can then be pulled from the bore 8. While I have shown in the drawings, four jaws and corresponding slots, it will be apparent that any number may be employed, it only being necessary to properly engage with the wire at a sufficient number of points to positively prevent slipping.

In the construction shown in Fig. 4, I have shown the tube as 7 in which the jaws 12 are mounted, in this instance the jaws are made curved, and I have shown three jaws which fill the tube 7, sufficiently when the conductor or wire 9 is in position to cause the teeth of the jaws to grip the conductor as before, the bore of the tube being tapered towards the outer end in order to cause the jaws to be forced against the wire. When the pull is placed on the wire, the action of the jaws is similar to that already described.

Having thus described my invention, what I claim as new and desire to secure by Letters Patent, is:—

1. In a trolley wire splicer, a body having shoulders thereon, tubes suitably connected with said body and abutting on said shoulders, each of said tubes having a suitable bore to receive an end of a conductor, jaws situated within said tubes adapted to grasp the conductor, and retaining guides for said jaws.

2. In a trolley wire splicer, a body, tubes thereon, each having a suitable bore to receive an end of a conductor, jaws situated within said tubes adapted to grasp the conductor, and retaining guides within said tubes for said jaws.

3. In a trolley wire splicer, tubes each having a suitable bore to receive an end of a conductor, jaws within said tubes, retaining guides for said jaws, and means for forcing the jaws against the trolley wire to lock the same in position.

4. In a trolley wire splicer, tubes each having a suitable bore to receive an end of a conductor, a plurality of separate jaws within said tubes, retaining guides for said jaws, and means for forcing the jaws against the trolley wire to lock the same in position.

5. In a trolley wire splicer, a body, tubes thereon, each having a suitable bore to receive an end of a conductor, a plurality of separate jaws within said tubes, retaining guides for said jaws, and means on opposite sides of said body for forcing the jaws against the trolley wire to lock the same in position.

6. In a trolley wire splicer, a body, tubes thereon, each having a suitable bore to receive an end of a conductor, a plurality of separate jaws within said tubes, guides for said jaws, means to retain said jaws in said guides, and means for forcing the jaws against the conductor to lock same in position.

7. A trolley wire splicer having a suitable bore to receive the ends of a conductor, gripping means within said splicer, a spring coöperating therewith and guide ways for holding said gripping means in proper position.

HARRY G. DYER.

Witnesses:
WM. J. VAN METER,
H. S. FAIRBANKS.